(12) United States Patent
Burd et al.

(10) Patent No.: US 6,931,585 B1
(45) Date of Patent: Aug. 16, 2005

(54) DETECTION IN THE PRESENCE OF MEDIA NOISE

(75) Inventors: Gregory Burd, Santa Clara, CA (US); Zining Wu, Los Altos, CA (US)

(73) Assignee: Marvell International Ltd., Hamilton (BM)

(*) Notice: Subject to any disclaimer, the term of this patent is extended or adjusted under 35 U.S.C. 154(b) by 485 days.

(21) Appl. No.: 10/208,312

(22) Filed: Jul. 29, 2002

Related U.S. Application Data

(60) Provisional application No. 60/345,725, filed on Jan. 3, 2002.

(51) Int. Cl.[7] ............................................. H03M 13/03
(52) U.S. Cl. ........................ 714/795; 714/794; 375/341
(58) Field of Search ................................ 714/794, 795, 714/796; 375/262, 341

(56) References Cited

U.S. PATENT DOCUMENTS

| | | | |
|---|---|---|---|
| 5,521,945 A | * 5/1996 | Knudson | 375/341 |
| 5,588,011 A | * 12/1996 | Riggle | 714/792 |
| 5,606,464 A | 2/1997 | Agazzi et al. | |
| 5,689,532 A | * 11/1997 | Fitzpatrick | 375/341 |
| 5,889,823 A | 3/1999 | Agazzi et al. | |
| 6,185,175 B1 | 2/2001 | Zook | |
| 6,201,839 B1 | 3/2001 | Kavcic et al. | |
| 6,246,723 B1 | 6/2001 | Bliss et al. | |
| 6,317,419 B1 | 11/2001 | Olafsson et al. | |
| 6,347,391 B1 | 2/2002 | Uesigi et al. | |
| 6,438,180 B1 | 8/2002 | Kavcic et al. | |

OTHER PUBLICATIONS

Galli, S.; A novel APP–based soft–output adaptive equalizer Exploiting non–linear MMSE fixed–lag smoothed estimates of the transmitted symbols, IEEE International Conference on Communications vol.: 4, Jun. 11–14, 2001, pp. 1084–1088.□□.*

Galli, S.; Non–linear MMSE estimation and SbS–MAP receivers, Proceedings IEEE International Symposium on Information Theory, Jun. 25–30, 2000, p.: 82.*

Aleksandar Kavcic/Jose F. Moura, "The Viterbi Algorithm and Markov Noise Memory", IEEE Transactions on Information Theory, vol. 46, No. 1, Jan. 2000, pp. 291–301.

Runsheng He/Nersi Nazari, "An Analytical Approach for Performance Evaluation of Partial Response Systems in the Presence of Signal–Dependent Medium Noise", 5 pages.

* cited by examiner

Primary Examiner—Joseph D. Torres

(57) ABSTRACT

A signal detector to detect data in an input signal. The signal detector includes a Viterbi-like detector to generate a most likely path corresponding to the data in the input signal. A linear post-processor determines at least one most likely error event in the most likely path, and generates revised paths based on the at least one most likely error event. A non-linear post-processor computes path metrics corresponding to each of the revised paths as a function of a non-linear noise model and selects one of the revised paths based on the path metrics.

60 Claims, 5 Drawing Sheets

DETECTION IN THE PRESENCE OF MEDIA NOISE

CROSS-REFERENCE TO RELATED APPLICATIONS

This application claims the benefit of the filing date of U.S. provisional application No. 60/345,725 filed Jan. 3, 2002, the content of which is herein incorporated by reference in its entirety.

TECHNICAL FIELD

An aspect of this invention relates to decoding a communication signal in the presence of noise.

BACKGROUND

With the continuing evolution of computer systems, there is an increasing demand for greater storage density. But, as storage density increases, problems associated with signal dependent noise and interference increase. To detect data in the presence of signal dependent noise, detectors typically employ complex schemes such as modifying the Euclidean branch metric to compensate for the noise or adaptively computing the branch metric. Other detectors have used a post-processor based on a model of the channel.

A signal detector to detect data in an input signal. The signal detector includes a Viterbi-like detector to generate a most likely path corresponding to the data in the input signal. A linear post-processor determines at least one most likely error event in the most likely path, and generates revised paths based on the at least one most likely error event. A non-linear post-processor computes path metrics corresponding to each of the revised paths as a function of a non-linear noise model and selects one of the revised paths based on the path metrics.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
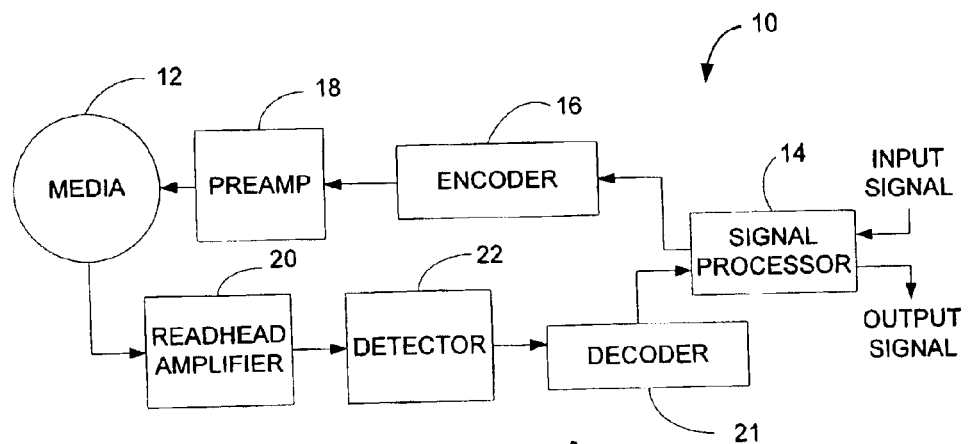
FIG. 1 illustrates a recording assembly for storing data.

FIG. 1 shows a recording assembly 10 for storing data. The recording assembly 10 includes media 12 to which data may be written and read. The media 12 may be included in any known storage device such as hard drives and optical disks. In a writing operation, a signal processor 14 may apply compression and error correction schemes to an input signal. An encoder 16 converts the processed input signal to a format suitable for storage by the storage unit 12. A preamp 18 amplifies and writes the encoded signal to the media 12. In a reading operation, a read head amplifier 20 detects and generates the read back signal by reading data from the media 12. The read head amplifier 20 may include a read equalizer for equalizing the data. A detector 22 detects symbols in the read back signal. The detector 22 is particularly suitable for signal detection in the presence of signal dependent noise. Although the detector 22 is described in conjunction with a recording system, the detector may be used for signal detection over any type of communication channel. A decoder 21 may decompress the decoded signal. The signal processor 14 may apply error correction to the decompressed signal to generate an output signal representing the recovered data.

Figure 2:
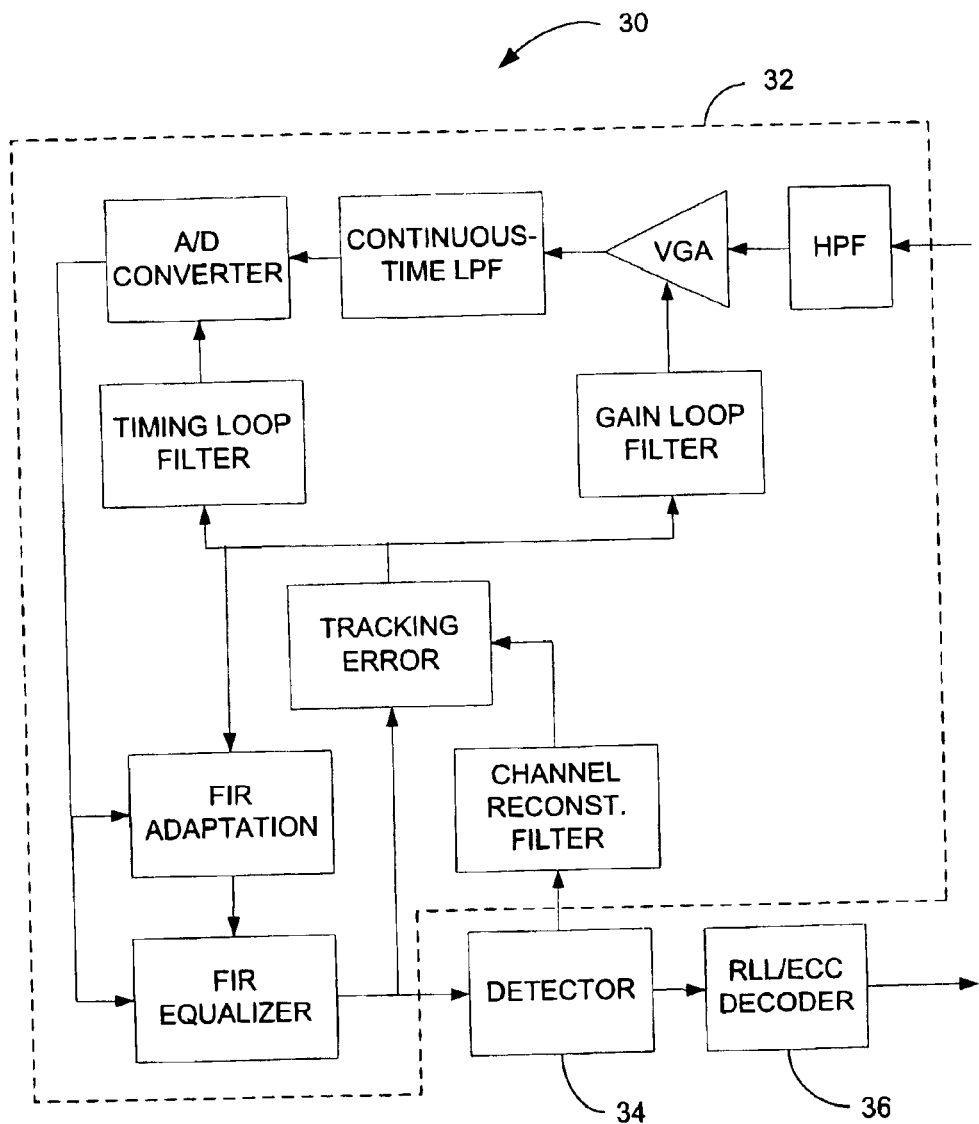
FIG. 2 shows a receiver for receiving a communication signal.

FIG. 2 shows a receiver 30 for decoding a communication signal that may include signal dependent noise. A signal processor 32 filters and equalizes the communication signal. The data in the filtered communication signal may be detected by a signal detector 34 in accordance with the teachings of the invention. The signal detector 34 is not limited to being implemented in the illustrated receiver 30, instead the signal detector may be included in any appropriate receiver. An RLL/ECC decoder 36 may then decode the detected data.

Figure 3:
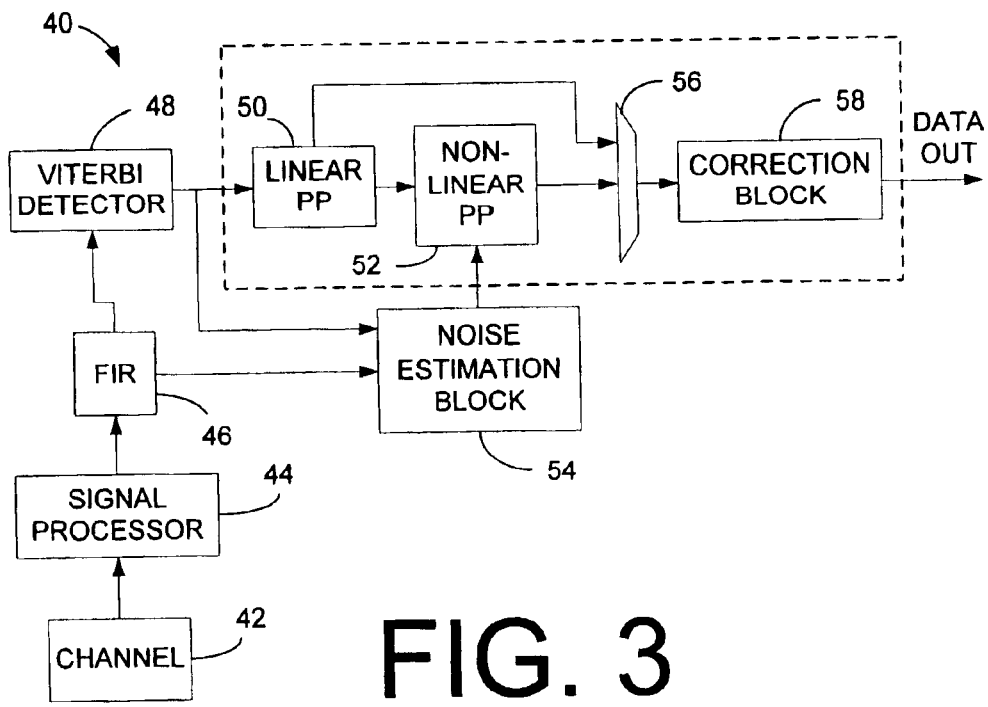
FIG. 3 is a block diagram of an aspect of a communication signal detector.

FIG. 3 shows an aspect of a non-linear signal detector 40 for detecting data in a communication signal. The non-linear signal detector 40 may detect data in the presence of media noise such as inter-symbol interference and other pattern dependent noise. A channel 42 communicates a stream of data to the non-linear signal detector 40. A signal processor 44 may filter and equalize the stream of data. A finite impulse response (FIR) filter 46 filters the stream of data. A Viterbi-like detector 48 may detect data in the stream of data and generate soft or hard decisions. Any Viterbi-like detector 48 that is derived under the assumption of additive white Gaussian noise (AWGN) may be employed such as partial response maximum likelihood (PRML) schemes or hybrids between tree/trellis detectors and decision feedback equalizers (DFE) including Fixed Delay Tree Search with Decision Feedback (FDTS/DF), and multilevel decision feedback (MDFE). A linear post-processor 50 filters the Viterbi decisions for dominant error events by identifying the least reliable Viterbi decisions. A list of the typical dominant error events may be used to identify the least reliable Viterbi decisions. The typical dominant error event list may include dominant error events such as {+}, {+−}, {+−+}, {+−+−}, and {+−+−+}. For each block of length C, the linear post-processor 50 may identify a list of N least reliable Viterbi decisions. The list of least reliable decisions may include decision information such as error location, error type, and polarity. The linear post-processor 50 may evaluate a metric such as a linear maximum likelihood distance penalty (MLDP) associated with an error event to identify the least reliable Viterbi decisions. The MLDP may be derived from a non-linear noise model of the communications channel output. The most likely error events corresponding to each of the least reliable decisions may be determined based on the list of typical dominant error events and a computed path metric. Preferably, two most likely error events are determined. However, any number of error events may be selected ranging from at least one. In addition, the number of error events selected may be varied based on factors such as the frequency of low reliability decisions. Revised paths corresponding to each of the least reliable decisions may be generated based on the most likely error events.

A non-linear post-processor 52 may determine a non-linear MLDP for each of the revised paths. The lower the value of the non-linear MLDP, the more likely the corresponding path is the best path. The non-linear MLDP may be a function of a non-linear path metric that includes a representation of data dependent channel noise.

$$MLDP_{nlin}(\text{error})=PM_{nlin}(viterbi\_out+\text{error})-PM_{nlin}(viterbi\_out)$$

$$MLDP_{nlin}(\text{error})=\Sigma(BM_{nlin}(viterbi\_out+\text{error})-BM_{nlin}(viterbi\_out))$$

A noise estimation block 54 may estimate the noise corresponding to the Viterbi decisions by using a non-linear channel model such as that described below in Equation BM, where x(D) represents the input bits to a channel and y(D) represents the output values of the channel.

$$y_t = \bar{y}_t + m_t(x(D)) + n_t(x(D))$$

where;

$$\bar{y}_t = \sum_{k=0}^{l} x_{t-k} \cdot h_k,$$

$m_t(x(D))$ represents data dependent mean shift, $n_t(x(D))$ is modeled as signal dependent Gauss-Markov noise process with memory length L, and $h_k$ represents the linear component.

$$n_t(x(D)) = \sum_{k=1}^{L} f_k(x(D))n_{t-k} + \sigma_t(x(D))N(0, 1).$$

To simplify, it is further assumed that;

$$m_t(x(D))=m_t(x_{t-l}, \ldots, x_{t-2}, x_{t-1}, x_t)$$

$$\sigma_t(x(D))=\sigma_t(x_{t-l}, \ldots, x_{t-2}, x_{t-1}, x_t)$$

$$f_k(x(D))=f_k(x_{t-l}, \ldots, x_{t-2}, x_{t-1}, x_t), \text{ for } \_k=1, \ldots, L$$

The corresponding non-linear Viterbi Branch Metric (BM) is given by:

$$BM = \ln(\sigma_t^2(x(D))) + \left(\frac{y_t - (\bar{y}_t + m_t) - \sum_{k=1'}^{L} f_k(x(D))n_{t-k}}{\sigma_t(x(D))}\right)^2 \quad \text{Eq. BM}$$

$$BM = \ln(\sigma_t^2(x(D))) + \left(\frac{n_t - \sum_{k=1}^{L} f_k(x(D))n_{t-k}}{\sigma_t(x(D))}\right)^2$$

$$BM = \ln(\sigma_t^2(x(D))) + \left(\sum_{k=0}^{L} \hat{f}_k(x(D))n_{t-k}\right)^2$$

where;

$$\hat{f}_0 = \frac{1}{\sigma_t(x(D))}, \hat{f}_1 = -f_1 \cdot \frac{1}{\sigma_t(x(D))}, \cdots \hat{f}_3 = -f_3 \cdot \frac{1}{\sigma_t(x(D))}.$$

A selector 56 selects the revised path that represents the most likely path based upon the path metrics such as the nonlinear MLDP computed for each of the most likely error events associated with a least reliable Viterbi decisions. The most likely path is the revised path having the lowest non-linear path metric. The selection of the most likely path may also be a function of other path information such as parity error status.

A correction block 58 revises the Viterbi decision to correspond to the selected most likely path and inserts the revised Viterbi decision into the output data stream.

Figure 4:
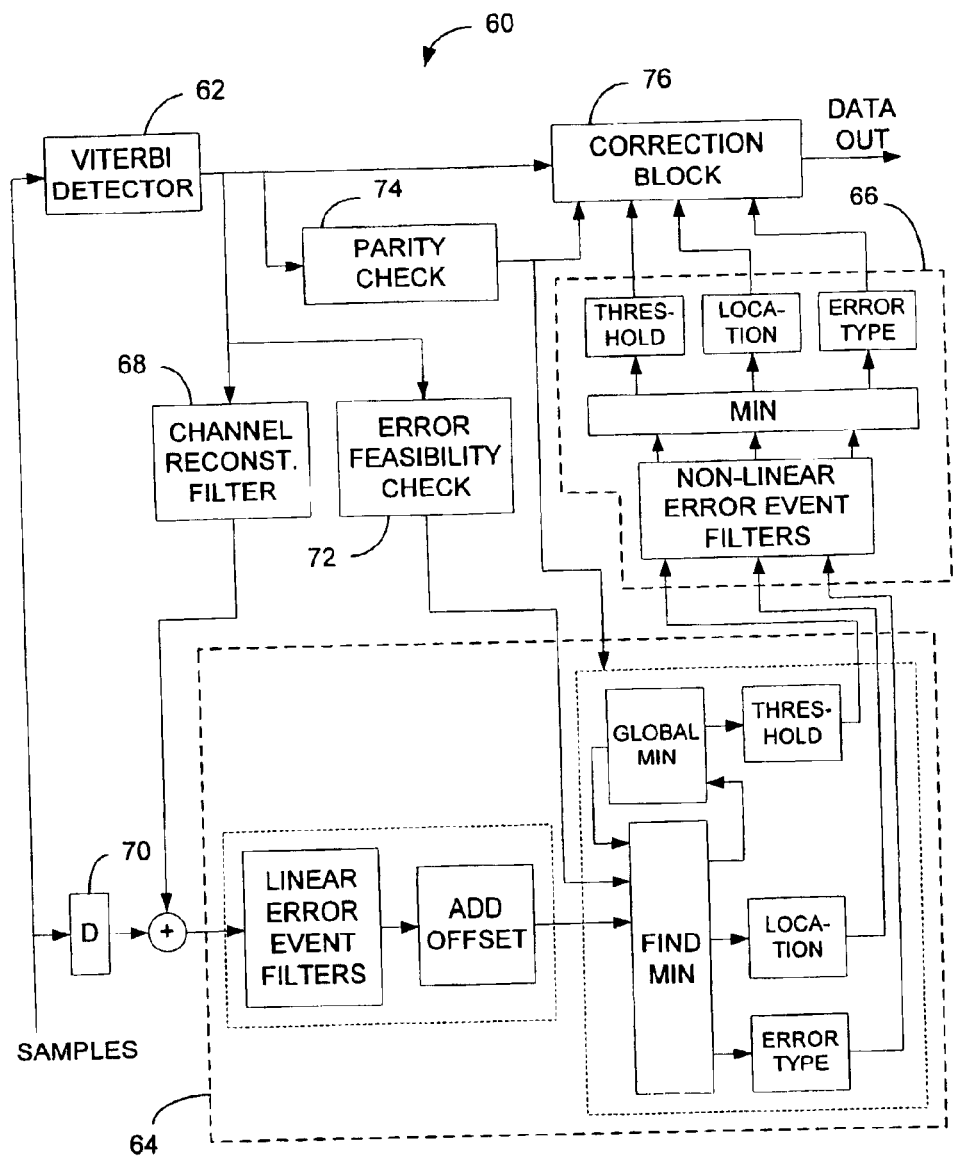
FIG. 4 is a block diagram of an aspect of a communication signal detector.

FIG. 4 shows another aspect of a non-linear signal detector 60 for detecting data in a communication signal. The non-linear signal detector 60 is similar in function to the non-linear signal detector 40 and including a Viterbi detector 62 to detect symbols in a data stream and generate decisions. A linear post-processor 64 and a non-linear post-processor 66 operate similarly to the linear post-processor 50 and non-linear post-processor 52. A channel reconstruction filter 68 and delay 70 shape the communication signal samples and Viterbi decisions that are input to the linear post-processor 64. An error feasibility check block 72 may evaluate the Viterbi decisions and linear post-processor outputs to determine whether an error might exist in the Viterbi decisions for a codeword. A parity block 74 determines the parity status, error or no error, of codewords of the Viterbi decisions. A correction block 76 may evaluate the parity status, then determine whether to select one of the revised paths or pass the Viterbi decisions for the codeword through without corrections. For example, the threshold for the MLDP value at which a codeword will be corrected may be adjusted as a function of the parity status so that when a parity error is indicated, the Viterbi decisions may be corrected even though the computed MLDPs do not strongly indicate a most likely path. Alternately, when a parity error is not indicated, the Viterbi decisions for the codeword will not be corrected unless the computed MLDPs very strongly indicate a most likely path.

Figure 5:
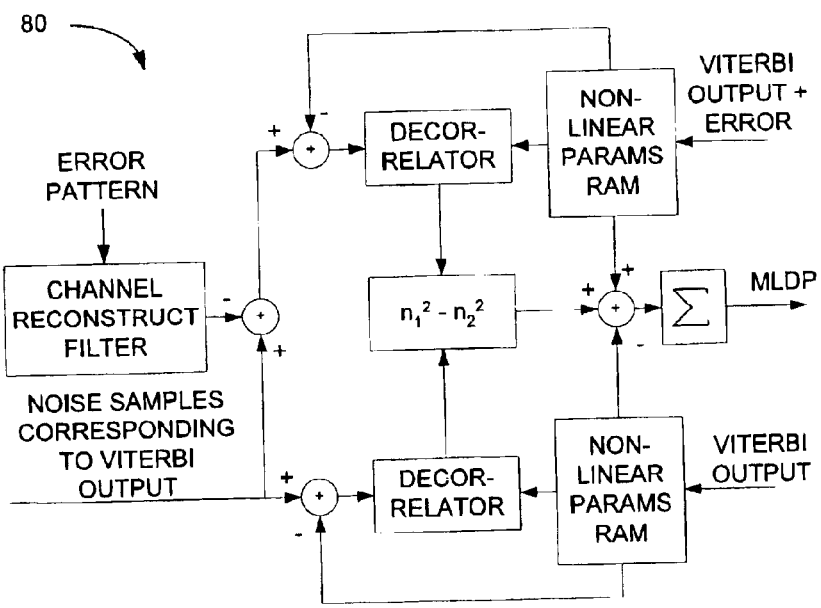
FIG. 5 is a block diagram of an aspect of an error event filter.

FIG. 5 shows a block diagram of an aspect of a non-linear error event filter 80. The non-linear error event filter 80 may compute an MLDP based on path metrics corresponding to a revised path. The MLDP may be described by the following equation.

$$MLDP_{nlin}(\text{error})=PM_{nlin}(viterbi\_out+\text{error})-PM_{nlin}(viterbi\_out)$$

Figure 6:
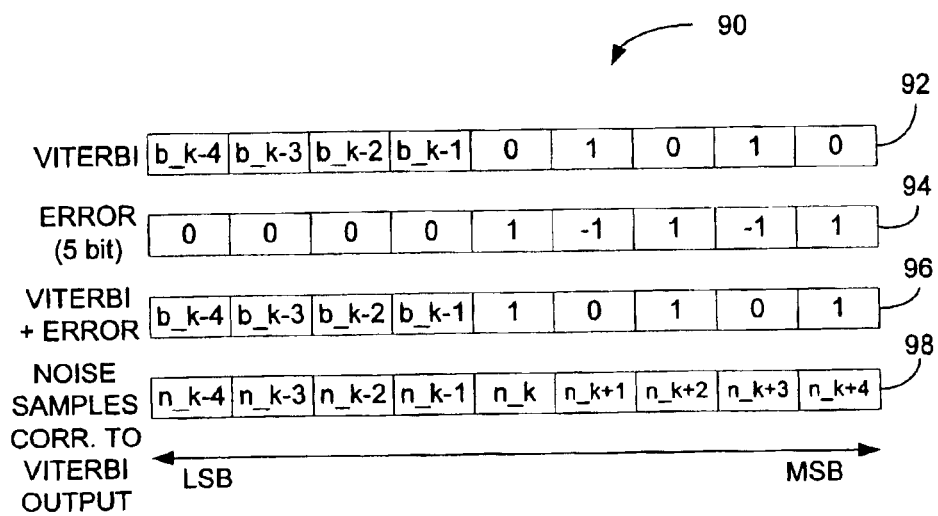
FIG. 6 is an error event processing diagram of a block of code.

FIG. 6 shows an error event processing diagram 90 of a block of code that may be processed by the non-linear error event filter 80. The error event processing diagram 90 illustrates the interrelationship between a Viterbi output 92, a 5-bit error 94, a resulting Viterbi+error 96, and a noise sample 98 corresponding to the Viterbi output 92.

Figure 7:
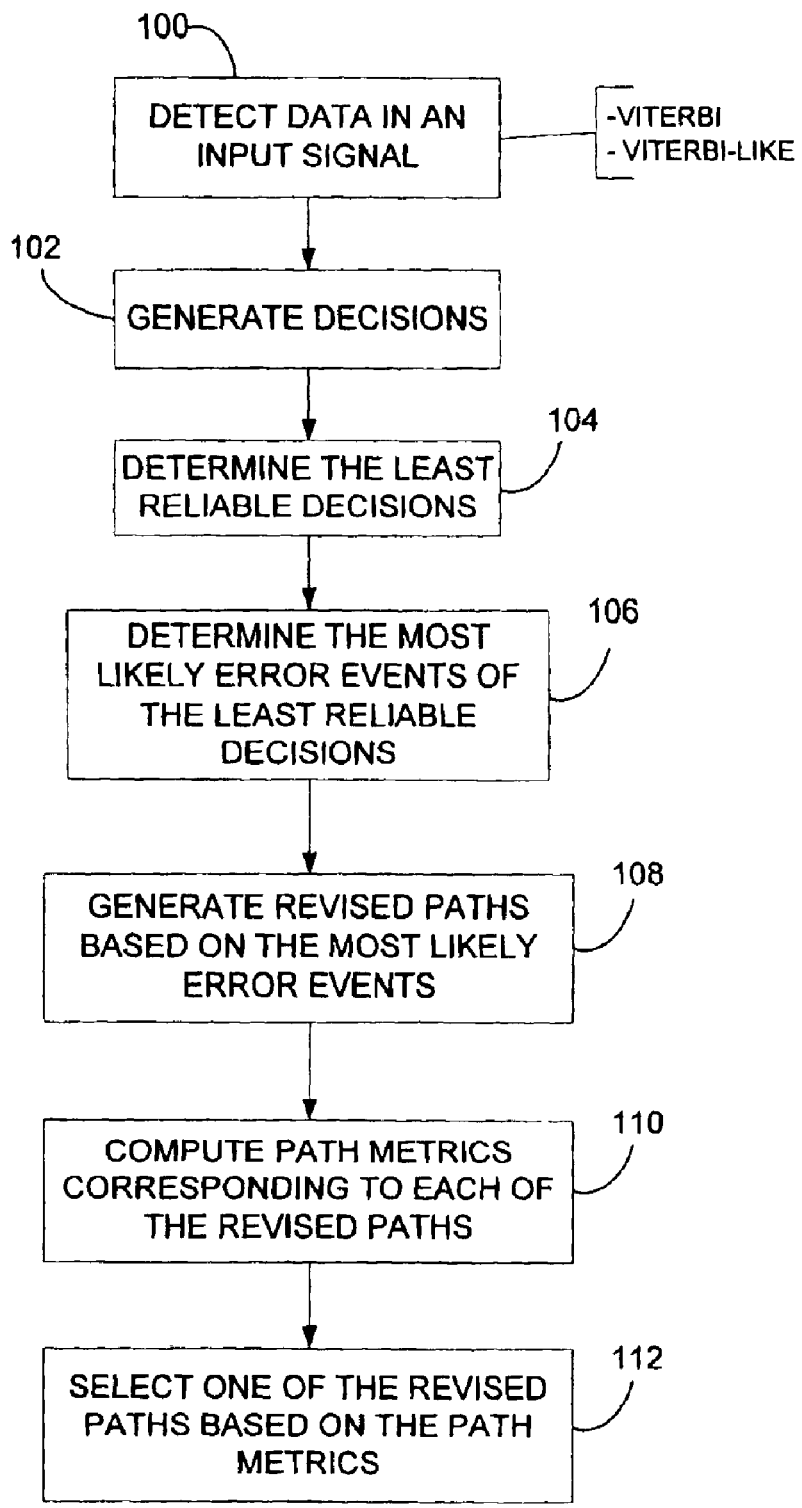
FIG. 7 is a flow diagram of a process for detecting data in a communication signal.

FIG. 7 shows a flow diagram of a process for detecting data in a communication signal. Starting at block 100, data in an input signal is detected by a Viterbi-like detector. Decisions, hard or soft, based on the detected data are generated at block 102. Continuing to block 104, the least reliable decisions are determined. At block 106, the most likely error events of the least reliable decisions are determined. Continuing to block 108, revised paths are generated based on the most likely error events and the corresponding least reliable decisions. At block 110, path metrics corresponding to each of the revised paths are computed. The path metrics may be used to compute an MLDP corresponding to each of the revised paths. At block 112, one of the revised paths is selected based on the path metrics.

A number of aspects of the invention have been described. Nevertheless, it will be understood that various modifications may be made without departing from the spirit and scope of the invention. Accordingly, other embodiments are within the scope of the following claims.

What is claimed is:

1. A signal detector to detect data in an input signal, comprising:
   a Viterbi-like detector to generate a most likely path corresponding to the data in the input signal;
   a linear post-processor to determine at least one most likely error event in the most likely path, and to generate revised paths based on the at least one most likely error event; and
   a non-linear post-processor to compute path metrics corresponding to each of the revised paths as a function of a non-linear noise model and to select one of the revised paths based on the path metrics.

2. The signal detector of claim 1 further comprising a noise estimation block to generate the non-linear noise model.

3. The signal detector of claim 1 wherein the non-linear noise model includes a linear channel component plus a non-linear noise component.

4. The signal detector of claim 3 wherein the non-linear noise model models the data as:

$$y_t = \bar{y}_t + m_t(x(D)) + n_t(x(D))$$

where;

$$\bar{y}_t = \sum_{k=0}^{t} x_{t-k} \cdot h_k, m_t(x(D))$$

represents data dependent mean shift, and $n_t(x(D))$ is modeled as signal dependent Gauss-Markov noise process.

5. The signal detector of claim 1 wherein the linear post-processor generates revised paths that correspond to each of the at least one most likely error event.

6. The signal detector of claim 1 further comprising a correction block to correct the most likely path based on the selected one of the revised paths.

7. The signal detector of claim 6 wherein the correction block evaluates a parity condition of the most likely path and corrects the most likely path based on the selected one of the revised paths and the parity condition.

8. The signal detector of claim 7 wherein the parity condition has a parity violated state and a parity not violated state; and
   wherein a correction threshold is adjusted based on the parity condition such that the correction threshold is set higher for the parity not violated state.

9. The signal detector of claim 1 wherein the at least one most likely error event are selected from a predetermined error event list.

10. The signal detector of claim 1 wherein the Viterbi-like detector is selected from a group consisting of Viterbi detectors, PRML detectors, tree/trellis detectors, decision feedback detectors and hybrid detectors.

11. A signal detector to detect data in an input signal, comprising:
    means for detecting data to generate a most likely path corresponding to the data in the input signal;
    means for determining at least one most likely error event in the most likely path, and to generate revised paths based on the at least one most likely error event; and
    means for computing path metrics corresponding to each of the revised paths as a function of a non-linear noise model and to select one of the revised paths based on the path metrics.

12. The signal detector of claim 11 further comprising means for estimating noise to generate the non-linear noise model.

13. The signal detector of claim 11 wherein the non-linear noise model includes a linear channel component plus a non-linear noise component.

14. The signal detector of claim 13 wherein the non-linear noise model models the data as:

$$y_t = \bar{y}_t + m_t(x(D)) + n_t(x(D))$$

where;

$$\bar{y}_t = \sum_{k=0}^{t} x_{t-k} \cdot h_k, m_t(x(D))$$

represents data dependent mean shift, and $n_t(x(D))$ is modeled as signal dependent Gauss-Markov noise process.

15. The signal detector of claim 11 wherein the means for determining generates revised paths that correspond to each of the at least one most likely error event.

16. The signal detector of claim 11 further comprising means for correcting to correct the most likely path based on the selected one of the revised paths.

17. The signal detector of claim 16 wherein the means for correcting evaluates a parity condition of the most likely path and corrects the most likely path based on the selected one of the revised paths and the parity condition.

18. The signal detector of claim 17 wherein the parity condition has a parity violated state and a parity not violated state; and
    wherein a correction threshold is adjusted based on the parity condition such that the correction threshold is set higher for the parity not violated state.

19. The signal detector of claim 11 wherein the at least one most likely error event are selected from a predetermined error event list.

20. The signal detector of claim 11 wherein the means for detecting data is selected from a group consisting of Viterbi detectors, PRML detectors, tree/trellis detectors, decision feedback detectors and hybrid detectors.

21. A method of detecting data in an input signal, comprising:
    detecting data in the input signal to generate a most likely path corresponding to the data;
    determining at least one most likely error event in the most likely path;
    generating revised paths based on the at least one most likely error event;
    computing path metrics corresponding to each of the revised paths as a function of a non-linear noise model; and
    selecting one of the revised paths based on the path metrics.

22. The method of claim 21 further comprising estimating noise to generate the non-linear noise model.

23. The method of claim 21 wherein the non-linear noise model includes a linear channel component plus a non-linear noise component.

24. The method of claim 23 wherein the non-linear noise model models the data as:

$$y_t = \bar{y}_t + m_t(x(D)) + n_t(x(D))$$

where;

$$\bar{y}_t = \sum_{k=0}^{t} x_{t-k} \cdot h_k, m_t(x(D))$$

represents data dependent mean shift, and $n_t(x(D))$ is modeled as signal dependent Gauss-Markov noise process.

25. The method of claim 21 wherein determining includes generating revised paths that correspond to each of the at least one most likely error event.

26. The method of claim 21 further comprising correcting the most likely path based on the selected one of the revised paths.

27. The method of claim 26 wherein correcting includes evaluating a parity condition of the most likely path; and
    correcting the most likely path based on the selected one of the revised paths and the parity condition.

28. The method of claim 27 wherein the parity condition has a parity violated state and a parity not violated state; and
    adjusting a correction threshold based on the parity condition such that the correction threshold is set higher for the parity not violated state.

29. The method of claim 21 wherein the at least one most likely error event is selected from a predetermined error event list.

30. A receiver, comprising:
    a signal processor to filter a communication signal and generate an input signal therefrom;
    a signal detector to detect data in the input signal, including;
        a Viterbi-like detector to generate a most likely path corresponding to the data in the input signal;
        a linear post-processor to determine at least one most likely error event in the most likely path, and to generate revised paths based on the at least one most likely error event; and
        a non-linear post-processor to compute path metrics corresponding to each of the revised paths as a function of a non-linear noise model and to select one of the revised paths based on the path metrics.

31. The receiver of claim 30 further comprising a noise estimation block to generate the non-linear noise model.

32. The receiver of claim 30 wherein the non-linear noise model includes a linear channel component plus a non-linear noise component.

33. The receiver of claim 32 wherein the non-linear noise model models the data as:

$$y_t = \bar{y}_t + m_t(x(D)) + n_t(x(D))$$

where;

$$\bar{y}_t = \sum_{k=0}^{t} x_{t-k} \cdot h_k, m_t(x(D))$$

represents data dependent mean shift, and $n_t(x(D))$ is modeled as signal dependent Gauss-Markov noise process.

34. The receiver of claim 30 wherein the linear post-processor generates revised paths that correspond to each of the at least one most likely error event.

35. The receiver of claim 30 further comprising a correction block to correct the most likely path based on the selected one of the revised paths.

36. The receiver of claim 35 wherein the correction block evaluates a parity condition of the most likely path and corrects the most likely path based on the selected one of the revised paths and the parity condition.

37. The receiver of claim 36 wherein the parity condition has a parity violated state and a parity not violated state; and
    wherein a correction threshold is adjusted based on the parity condition such that the correction threshold is set higher for the parity not violated state.

38. The receiver of claim 30 wherein the at least one most likely error event is selected from a predetermined error event list.

39. The receiver of claim 30 wherein the Viterbi-like detector is selected from a group consisting of Viterbi detectors, PRML detectors, tree/trellis detectors, decision feedback detectors and hybrid detectors.

40. The receiver of claim 30 wherein the receiver is included in a disk drive assembly.

41. A computer program to configure a general purpose computer to perform a detecting method for an input signal, comprising:
    detecting data in the input signal to generate a most likely path corresponding to the data;
    determining at least one most likely error event in the most likely path;
    generating revised paths based on the at least one most likely error event;
    computing path metrics corresponding to each of the revised paths as a function of a non-linear noise model; and
    selecting one of the revised paths based on the path metrics.

42. The computer program of claim 41 further comprising estimating noise to generate the non-linear noise model.

43. The computer program of claim 41 wherein the non-linear noise model includes a linear channel component plus a non-linear noise component.

44. The computer program of claim 43 wherein the non-linear noise model models the data as:

$$y_t = \bar{y}_t + m_t(x(D)) + n_t(x(D))$$

where;

$$\bar{y}_t = \sum_{k=0}^{t} x_{t-k} \cdot h_k, m_t(x(D))$$

represents data dependent mean shift, and $n_t(x(D))$ is modeled as signal dependent Gauss-Markov noise process.

45. The computer program of claim 41 wherein determining includes generating revised paths that correspond to each of the at least one most likely error event.

46. The computer program of claim 41 further comprising correcting the most likely path based on the selected one of the revised paths.

47. The computer program of claim 46 wherein correcting includes evaluating a parity condition of the most likely path; and
    correcting the most likely path based on the selected one of the revised paths and the parity condition.

48. The computer program of claim 47 wherein the parity condition has a parity violated state and a parity not violated state; and
    adjusting a correction threshold based on the parity condition such that the correction threshold is set higher for the parity not violated state.

49. The computer program of claim 41 wherein the at least one most likely error event is selected from a predetermined error event list.

50. A receiver, comprising:
a signal processor to filter a communication signal and generate an input signal therefrom;
a signal detector to detect data in the input signal, including;
   means for detecting data to generate a most likely path corresponding to the data in the input signal;
   means for determining at least one most likely error event in the most likely path, and to generate revised paths based on the at least one most likely error event; and
   means for computing path metrics corresponding to each of the revised paths as a function of a non-linear noise model and to select one of the revised paths based on the path metrics.

51. The receiver of claim 50 further comprising means for estimating noise to generate the non-linear noise model.

52. The receiver of claim 50 wherein the non-linear noise model includes a linear channel component plus a non-linear noise component.

53. The receiver of claim 52 wherein the non-linear noise model models the data as:

$$y_t = \bar{y}_t + m_t(x(D)) + n_t(x(D))$$

where;

$$\bar{y}_t = \sum_{k=0}^{t} x_{t-k} \cdot h_k, \, m_t(x(D))$$

represents data dependent mean shift, and $n_t(x(D))$ is modeled as signal dependent Gauss-Markov noise process.

54. The receiver of claim 50 wherein the means for determining generates revised paths that correspond to each of the at least one most likely error event.

55. The receiver of claim 50 further comprising means for correcting to correct the most likely path based on the selected one of the revised paths.

56. The receiver of claim 55 wherein the means for correcting evaluates a parity condition of the most likely path and corrects the most likely path based on the selected one of the revised paths and the parity condition.

57. The receiver of claim 56 wherein the parity condition has a parity violated state and a parity not violated state; and wherein a correction threshold is adjusted based on the parity condition such that the correction threshold is set higher for the parity not violated state.

58. The receiver of claim 50 wherein the at least one most likely error event are selected from a predetermined error event list.

59. The receiver of claim 50 wherein the means for detecting data is selected from a group consisting of Viterbi detectors, PRML detectors, tree/trellis detectors, decision feedback detectors and hybrid detectors.

60. The receiver of claim so wherein the receiver is included in a disk drive assembly.

* * * * *

UNITED STATES PATENT AND TRADEMARK OFFICE
CERTIFICATE OF CORRECTION

PATENT NO. : 6,931,585 B1 Page 1 of 1
APPLICATION NO. : 10/208312
DATED : August 16, 2005
INVENTOR(S) : Burd et al.

It is certified that error appears in the above-identified patent and that said Letters Patent is hereby corrected as shown below:

IN THE PATENT:

Column 3, Line 46: In the equation: Delete "K=1'''" and insert -- K=1 --

Signed and Sealed this

Twenty-eighth Day of November, 2006

JON W. DUDAS
*Director of the United States Patent and Trademark Office*